United States Patent Office 2,975,181
Patented Mar. 14, 1961

2,975,181
METHOD FOR THE PREPARATION OF PIPERAZINE SALTS

Joseph J. Scigliano and Edgar C. Britton, Midland, Mich., assignors to The Dow Chemical Company, Midland, Mich., a corporation of Delaware No Drawing. Filed Mar. 12, 1956, Ser. No. 570,683

13 Claims. (Cl. 260—268)

This invention relates to an improved method for the preparation of salts of piperazine and substituted piperazines with polycarboxylic acids.

Several processes are available for preparing piperazine and substituted piperazines from alkanolamines. In such processes, the piperazine products are usually available in or from the reaction mass in crude mixtures with the unreacted or uncyclized portions of the alkanolamines from which they were prepared or in combination with various by-product materials which may be formed in the reaction. This may frequently be the case, for example, when piperazines are prepared by directly cyclizing alkanolamines or alkanolamine hydrohalides and the like according to frequently employed techniques. Besides alkanolamines, including 2(2-aminoethylamino)ethanol which is also known as 2-hydroxyethylethylene diamine, such by-product materials as various dialkanolamines, morpholine and ammonia may also be formed and present in the reaction mass.

Various salts of piperazine and substituted piperazines with polycarboxylic acids may be advantageously utilized for numerous applications including, in particular, for anthelmintic purposes. Piperazine citrate, for example, is frequently used for deworming livestock and for treating other domestic animals afflicted with filariasis. Ordinarily, the desired salt compounds are prepared from the purified piperazine products after they have been isolated from the reaction masses in which they were obtained. This generally is an inconvenient and tedious procedure which advantageously may be eliminated in the practice of the invention.

It is among the principal objects of the present invention to provide a direct method for the preparation of polycarboxylic acid salts of piperazine and substituted piperazines from their mixtures with alkanolamines and other materials with which they may be combined after manufacture including, as mentioned, dialkanolamines, morpholine, ammonia and the like. This object, and other objects and advantages may be accomplished by practice of the method of the present invention which comprises adding a polycarboxylic acid to a crude mixture in solution that is comprised of a piperazine and an alkanolamine; then adding to the solution a second amount of an acid selected from the group consisting of hydrohalic acids and organic monocarboxylic aliphatic acids that contain from 1 to 6 carbon atoms in their molecules, said second amount of acid being at least a stoichiometric equivalent amount to the amount of the alkanolamine and by-product material which is present in the solution; and subsequently recovering the piperazine salt by precipitation from the dissolved reaction mass. Substantially quantitative yields of the piperazine salts in essentially pure form may be prepared from crude dissolved mixtures of piperazines and alkanolamines with the present method.

The piperazine compounds whose salts may be obtained in the practice of the present invention may be represented by the general formula:

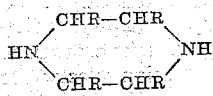

wherein each R may be independently selected from the group consisting of a hydrogen atom and an alkyl radical containing from 1 to 4 carbon atoms. They may be present in crude dissolved mixtures which are comprised of alkanolamines having the general formula:

HO—CHR—CHR—NH$_2$ wherein, within the foregoing limitation, each R may be selected from the group consisting of a hydrogen atom and a substituent alkyl radical containing from 1 to 4 carbon atoms. Ordinarily, the piperazines are available in crude mixtures with the alkanolamines from which they were manufactured. Frequently, however, byproduct materials of the mentioned type may be present in the crude mixture with the alkanolamines. Usually, the piperazines are prepared from alkanolamines that contain from 2 to 8 carbon atoms in their molecule. Salts of piperazine, 2,5-dimethylpiperazine and 2,5-diethylpiperazine may be manufactured with especial benefit in accordance with the method of the invention.

Any polycarboxylic acid may be utilized in the invention although it is more advantageous to employ those which are molecularly comprised of 2 to 3 functional carboxyl groups and 2 to 10 carbon atoms. Citric acid and tartaric acid (mono- and dihydroxy aliphatic polycarboxylic acids, respectively), malonic acid (a dibasic aliphatic acid also known as propandioic acid), succinic acid (another dibasic aliphatic acid which is also known as butandioic acid), phthalic acid (a dicarboxylic hydrocarbon aromatic acid) and like polycarboxylic acids may also be utilized. Up to stoichiometric equivalent amounts of the acid, based on the piperazine or substituted piperazine in solution, may be employed. It is usually undesirable, for reasons of efficiency, to employ less than about 0.6 stoichiometric equivalents of the polycarboxylic acid for each equivalent of the piperazine compound which is present in the solution. Usually the reaction can be accomplished at room temperature.

Hydrobromic or hydrochloric acid are usually suitable hydrohalic acids for employment in the method of the invention. When it is desired to employ an aliphatic acid, good results may generally be had with such organic alkane monocarboxylic acids as formic, acetic, propionic or butyric acid. It is frequently advantageous, before or after addition of the acid to the mixture, to incorporate methanol in the mass for the purpose of better retaining in solution the hydrohalide which is formed from the alkanolamine or by-product material, or both, during the isolation and recovery of the piperazine salt. It is usually beneficial to incorporate an equal proportion by weight of the alcohol to the amount of water which is present in the dissolved mixture.

The piperazine salt product may be recovered readily from the reaction mass by conventional precipitation or crystallization techniques which, as is apparent, cause the desired salt product to be physically insolubilized in the reaction mass in which it is obtained. Thus the reaction mass may be chilled or evaporated, or both, for this purpose. If desired, the precipitated product may be further purified by reprecipitation or recrystallization or other purifying techniques although, in many instances and for most purposes, its purity as directly obtained is sufficient to preclude any necessity for such additional operations.

It is convenient to practice the invention with the crude mixture being diversely acidified and the piperazine salt recovered therefrom by batch-wise techniques using apparatus that is adapted for the purpose. By such a procedure, essentially complete reaction and recovery of the piperazine compounds can easily be achieved. However, if it is preferred, the method can be conducted on a continuous basis by acidifying the mixture while it is passing through a suitable reaction chamber and by recovering the salt in continuous or semi-continuous precipitation or crystallization apparatus of the type which is commonly used in such operations.

The invention is further illustrated in and by the following examples although it is not intended to be limited thereto or restricted thereby.

EXAMPLE I

A crude mixture of piperazine and ethanolamine in aqueous solution was obtained containing about 48.8 grams (0.568 mole) of piperazine and 34.8 grams (0.586 mole) of ethanolamine in about 100 grams of water. The mixture represented an incompletely purified piperazine product which had been prepared from ethanolamine hydrochloride. After caustic neutralization, the piperazine-enthanolamine mixture was obtained as the distillate from the reaction mass in the cut from about 50 to 130° C. under 100 mm. Hg.

About 72.5 grams (0.378 mole) of citric acid dissolved in about 100 grams of methanol were added to the crude aqueous solution with cooling to room temperature. Following this, about 58.6 grams (0.586 mole) of aqueous hydrochloric acid, having a specific gravity of about 1.18, was added to the already acidified mass. Upon cooling to about 5–10° C., about 120 out of 121.3 theoretical grams of piperazine citrate precipitate in a fine granular form. The salt was filtered, washed in methanol, and dried. It had a melting point between 208–210° C. Recrystallization of the piperazine citrate from 50 percent aqueous methanol gave a material having a purity of 98 percent with about 95 percent recovery of the recrystallized salt.

EXAMPLE II

Various polycarboxylic acid salts of piperazine were prepared in and directly recovered from aqueous mixtures of piperazine and ethanolamine in a manner similar to that set forth in the first example. In each case, a piperazine-equivalent amount of the desired polycarboxylic acid was first added to the crude mixture, after which an amount of concentrated hydrochloric acid equivalent to the alkanolamine was added and the acidified mass, upon cooling, was diluted with methanol to precipitate the polycarboxylic acid salt product of piperazine. About 0.1 mole quantities of each of the reactant materials were employed in all cases. In the following table are given the pertinent data and the results that were obtained in the several runs. In run "A," piperazine tartrate was prepared; in run "B" it was piperazine malonate; and in runs "C" and "D" it was piperazine succinate and piperazine phthalate, respectively.

*Table I*

VARIOUS POLYCARBOXYLIC ACID SALTS OF PIPERAZINE FROM MIXTURES OF PIPERAZINE AND ETHANOLAMINE

| Run | "A" | "B" | "C" | "D" |
|---|---|---|---|---|
| Amount of Piperazine in mixture, grams | 8.6 | 8.6 | 8.6 | 8.6 |
| Amount of Ethanolamine in mixture, milliliters | 6 | 6 | 6 | 6 |
| Amount of water in mixture, milliliters | 40 | 40 | 40 | 40 |
| Polycarboxylic acid | Tartaric | Malonic | Succinic | Phthalic |
| Amount of Polycarboxylic acid added to mixture, grams | 15.0 | 10.4 | 11.8 | 16.6 |
| Amount of conc. HCl (S.G. 1.18) added to mixture, milliliters | 8.5 | 8.5 | 8.5 | 8.5 |
| Concentration of methanol in solution after dilution, percent by volume | 53 | 66 | 60 | 66 |
| Yield of piperazine salt precipitated, percent | quantitative | 82 | 71 | 53.6 |
| Melting point of polycarboxylic acid salt of piperazine, °C | 243–245 | 198–200 | 205–208 | 193–198 |

EXAMPLE III

About 12.7 grams (0.066 mole) of citric acid was added to a mixture comprised of about 8.6 grams (0.1 mole) of piperazine, 6 milliliters (0.1 mole) of ethanolamine and 20 milliliters of water. About 9.2 milliliters (0.1 mole) of butyric acid was then added to the mixture which was diluted with methanol until an alcohol concentration of about 66 percent by volume was obtained. A quantitative yield of piperazine citrate, having a melting point in the neighborhood of 202–205° C., was precipitated from the alcoholic solution.

Similar results may be obtained when propionic, acetic or formic acid are employed in place of butyric acid.

EXAMPLE IV

A mixture containing about 8.7 milliliters (0.1 mole) of morpholine, 12.8 grams (0.15 mole) of piperazine and 40 milliliters of water was prepared. To this mixture was added about 19.2 grams (0.1 mole) of citric acid and 8.5 milliliters (0.1 mole) of concentrated aqueous hydrochloric acid having a specific gravity of about 1.18. The acidified mixture was then cooled and diluted with about 120 milliliters of methanol. About 31.5 grams of piperazine citrate, having a melting point between about 205 and 209° C., was precipitated and recovered from the alcoholic solution.

EXAMPLE V

About 11.4 grams (0.1 mole) of trans-2,5-dimethylpiperazine was prepared in a mixture with about 7.7 grams (0.1 mole) of isopropanolamine and 20 milliliters of water. About 12.7 grams (0.66 mole) of citric acid was then added to the mixture along with about 8.5 milliliters (0.1 mole) of concentrated aqueous hydrochloric acid having a specific gravity of about 1.18. After being cooled, the acidified mixture was diluted with methanol to obtain about an 80 percent by volume alcoholic solution. About 17 grams of trans-2,5-dimethylpiperazine citrate was precipitated representing about a 71 percent yield of the reactant materials. The melting point of the recovered salt was between about 230 and 235° C.

Similar excellent results may be obtained in recovering polycarboxylic acid salts of 2,5-diethylpiperazine from analogous crude mixtures of the substituted piperazine or when piperazine or substituted piperazines are prepared and recovered from crude aqueous mixtures containing ammonia, 2(2-aminoethyl amino) ethanol and the like.

What is claimed is:

1. Method for the preparation of a salt product of (a) a polycarboxylic acid and (b) a piperazine compound from (c) a crude mixture in aqueous solution of said piperazine compound (b), which crude mixture is obtained from the direct cyclization of (d) an alkanolamine starting material corresponding to said piperazine compound (b), said alkanolamine material (d) containing half as many carbon atoms as said corresponding piperazine compound (b), which polycarboxylic acid (a) contains from 2 to 3 carboxyl groups and from 2 to 10 carbon atoms in its molecule and is selected from the group of so limited acids that consists of those from (a1) saturated hydrocarbon aliphatics, (a2) saturated hydroxylated hydrocarbon aliphatics containing from 1 to 2 hydroxy substituents and (a3) hydrocarbon aromatics and which piperazine compound (b) is of the general formula:

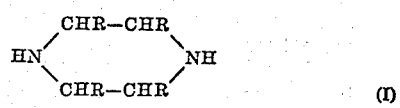

(I)

wherein each R is independently selected from the group consisting of hydrogen and alkyl radicals containing from 1 to 4 carbon atoms, said corresponding alkanolamine starting material (d) being selected from the group consisting of (d1) corresponding alkanolamines of the general structure:

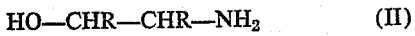

$$HO-CHR-CHR-NH_2 \quad (II)$$

wherein each R is as defined in the above Formula I and (d2) hydrohalides of said corresponding alkanolamines of the Formula II containing half as many carbon atoms as said piperazine compound (b) of the Formula I, (c2) a hydrohalide of a corresponding alkanolamine of the Formula II containing half as many carbon atoms as said piperazine compound (b) of the Formula I, (c3) a dimer of the corresponding alkanolamine (d) of the Formula II that contains the same number of carbon atoms as said piperazine compound (b) of the Formula I, (c4) a morpholine compound containing the same number of carbon atoms as said piperazine compound (b) of the Formula I, which morpholine compound is of the general formula:

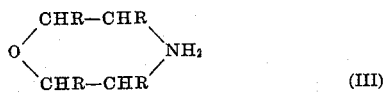

wherein each R is as defined in the above Formula I, said morpholine compound being obtained as a by-product of cyclization to said piperazine compound (b) of the Formula I of said corresponding alkanolamine (d) of the Formula II, (c5) ammonia and (c6) non-reactive mixtures thereof, which method comprises: (A) adding to said crude mixture (c) a quantity of said polycarboxylic acid (a) in an amount of at least about 0.6 stoichiometric equivalents of said polycarboxylic acid (a) for each equivalent of said piperazine compound (b) of the Formula I that is in said crude mixture (c) to provide a dissolved salt mixture (e) in an aqueous resulting solution (f) of said polycarboxylic acid (a) in said crude mixture (c); then (B) adding to said resulting solution (f) a second amount of an acid (g) that is stronger than said polycarboxylic acid (a), which stronger acid (g) is selected from the group consisting of (g1) hydrohalic acids and (g2) organic alkane monocarboxylic acids that contain from 1 to 6 carbon atoms in their molecules, said second amount of stronger acid (g) being a quantity that is at least a stoichiometric equivalent amount to the amount of said alkanolamine (d) of the Formula II which is present in said resulting solution (f); (C) physically insolubilizing said salt product (e) in said resulting solution (f) to precipitate said salt product (e) in solid form therein; and (D) subsequently physically isolating said salt product (e) in solid form.

2. The method of claim 1, wherein said salt product (e) is physically insolubilized in said resulting solution (f) by chilling said resulting solution in said step (C) to crystallize said salt product therefrom.

3. The method of claim 1, wherein said salt product (e) is physically insolubilized in said resulting solution (f) by heating said resulting solution in said step (C) to evaporate water therefrom.

4. The method of claim 1 wherein the polycarboxylic acid (a) is citric acid.

5. The method of claim 1 wherein the polycarboxylic acid (a) is tartaric acid.

6. The method of claim 1 wherein piperazine and ethanolamine are in the crude mixture (c) in aqueous solution.

7. The method of claim 1 wherein 2,5-dimethyl piperazine and isopropanolamine are in the crude mixture (c) in aqueous solution.

8. The method of claim 1 wherein 2,5-diethyl piperazine and 1-amino-2-butanol are in the crude mixture (c) in aqueous solution.

9. The method of claim 1 wherein the second amount of said stronger acid (g) that is employed in said step (B) is at least a stoichiometric equivalent amount to the total amount of alkanolamine material (d) which is present.

10. The method of claim 1 wherein the second amount of said stronger acid (g) that is employed in said step (B) is at least a stoichiometric equivalent amount to the total amount of the alkanolamine (c1) and ammonia (c5) which is present.

11. The method of claim 1 wherein the second amount of said stronger acid (g) that is employed in said step (B) is at least a stoichiometric equivalent amount to the total amount of the alkanolamine (c1) and morpholine compound (c4) of the Formula III which is present.

12. The method of claim 1 and including in addition to and in sequential combination with the steps therein set forth the additional step (B–C) of incorporating methanol in the resulting solution (f) acidified with said stronger acid (g) before physically insolubilizing in said step (C) said salt product (e) of said polycarboxylic acid (a) and said piperazine compound (b).

13. The method of claim 1 wherein the stronger acid (g) used as said second amount of acid in said step (B) is hydrochloric acid.

References Cited in the file of this patent

UNITED STATES PATENTS

| | | |
|---|---|---|
| 523,018 | Stoehr | July 17, 1894 |
| 2,085,786 | Bottoms | July 6, 1937 |
| 2,085,787 | Bottoms | July 6, 1937 |

UNITED STATES PATENTS

| | | |
|---|---|---|
| 18,981 | Great Britain of 1896 | July 24, 1897 |

OTHER REFERENCES

Degering: An Outline of Organic Nitrogen Compounds (1945), p. 326.

Morton: The Chemistry of Heterocyclic Compounds (1946), p. 504.